Nov. 10, 1936.   W. L. GILL ET AL   2,060,065
HEATING, DRYING, AND STERILIZING CABINET FOR TOWELS AND THE LIKE
Filed May 18, 1934   2 Sheets-Sheet 1

Inventor
Walter L. Gill and
Volney C. Kincaid
By Shepherd & Campbell
Attorneys

Nov. 10, 1936.  W. L. GILL ET AL  2,060,065
HEATING, DRYING, AND STERILIZING CABINET FOR TOWELS AND THE LIKE
Filed May 18, 1934  2 Sheets-Sheet 2

Inventor
Walter L. Gill and
Volney C. Kincaid
By Shepherd & Campbell
Attorneys

Patented Nov. 10, 1936

2,060,065

UNITED STATES PATENT OFFICE 2,060,065

HEATING, DRYING, AND STERILIZING CABINET FOR TOWELS AND THE LIKE

Walter L. Gill and Volney C. Kincaid, Redlands, Calif.; said Kincaid assignor to said Gill Application May 18, 1934, Serial No. 726,374

3 Claims. (Cl. 21—18)

This invention relates to a heating, drying and sterilizing cabinet for towels and like articles. The purposes and advantages of the invention will be more fully set forth in the detailed description which follows.

In the accompanying drawings, Fig. 1 is a front elevation of a cabinet, employing a plurality of drawers.

Like numerals designate corresponding parts in all of the figures of the drawings.

Figure 1:
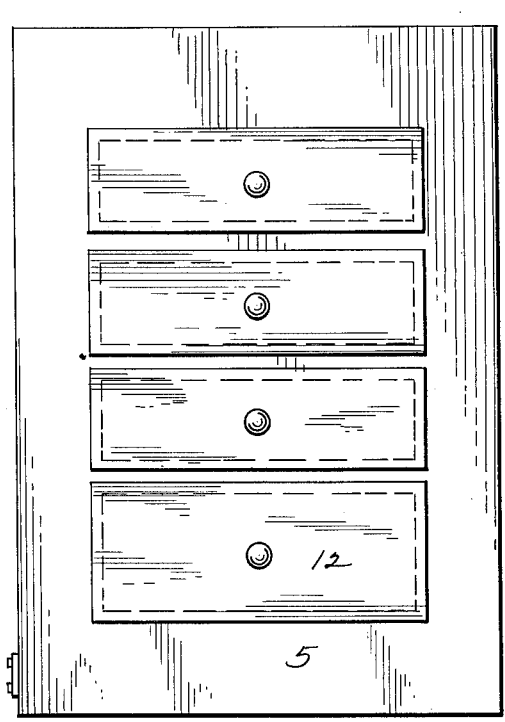

Referring to the form of the invention illustrated in Figures 1 to 4, 5 designates the walls of a cabinet of any suitable shape. For purposes of illustration, we have shown a rectangular cabinet having double walls with insulation 6 between them for the conservation of heat, though cabinets of other shapes and proportions may be employed. An L-shaped baffle is disposed within the cabinet and comprises a horizontal wall 7a and a vertical wall 7b. The space between the horizontal wall 7a of the baffle and the bottom of the cabinet receives any suitable heating means. Merely as illustrative of a heating means, we have indicated an electric heating element 8 in said space, though a gas or other type of heater may be used if desired. One or more air inlet openings 9 permit the entry of atmospheric air into the space which receives the heating element, and the heated air travels from this space upwardly through the passageway 10 and between the wall 7b of the baffle and the adjacent wall of the cabinet. The heated air flows in the direction indicated by the arrows to one or more outlet openings 11, said openings being preferably disposed in a side wall of the cabinet and at a relatively low point with respect to the height of the cabinet. In its passage, the heated air passes through and about the towel receiving drawers 12. The walls of these drawers, with the exception of the front and rear walls, are of reticulated formation. They may be made of perforated metal or of screen wire of any suitable mesh. The towels to be heated, sterilized and dried are placed in these drawers. We preferably make the rear walls 13 of the drawers of such amplitude that when the drawers are drawn out to their limit of movement, said walls close the openings and prevent the escape of the heat.

We wish it to be understood that the structure so far described is merely illustrative of the principle of the invention. We do not intend to limit ourselves with respect to either the number, size or shape of drawers.

Figure 2:
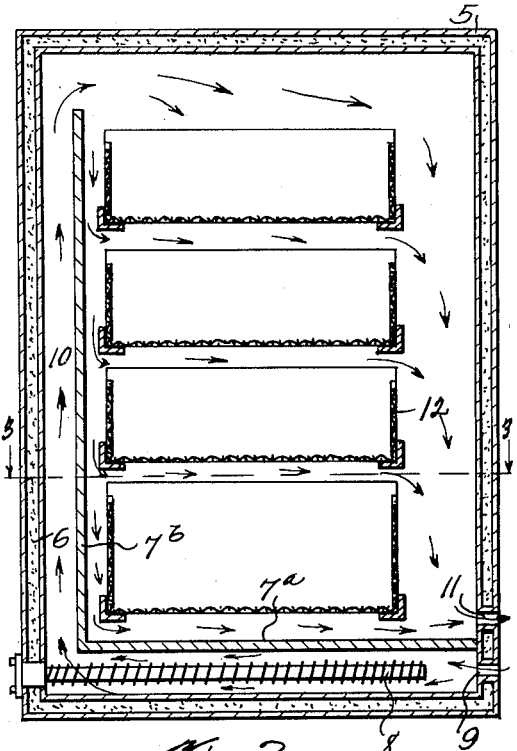
Fig. 2 is a transverse vertical section of the cabinet of Fig. 1.
Figure 3:
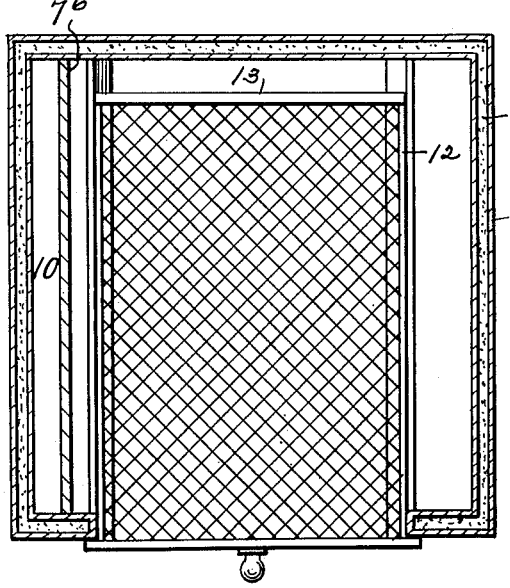
Fig. 3 is a horizontal sectional view upon line 3—3 of Fig. 2.
Figure 4:
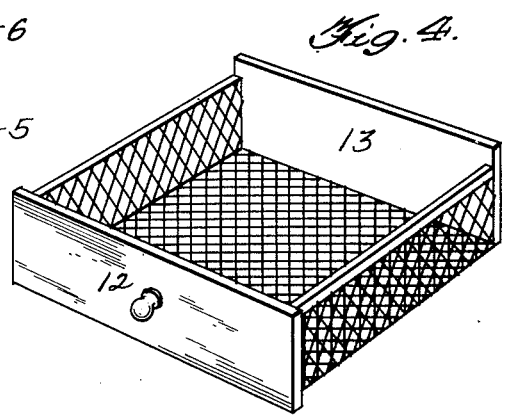
Fig. 4 is a detailed view of one of the drawers.
Figure 5:
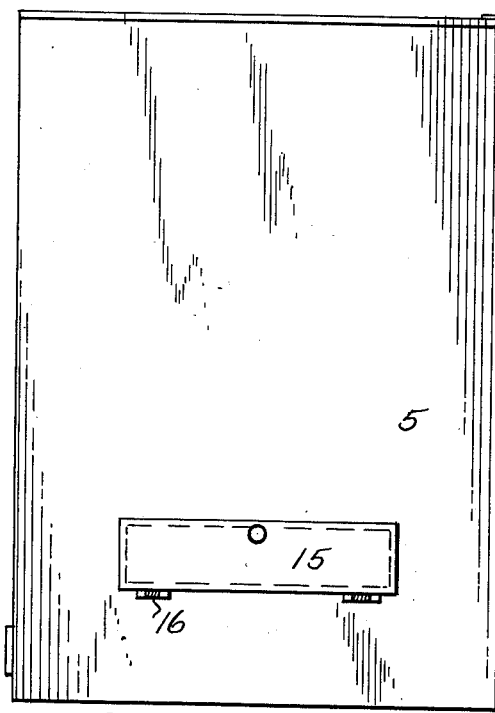
Fig. 5 is a front elevation of a modified form of cabinet, of a bin-like nature.
Figure 6:
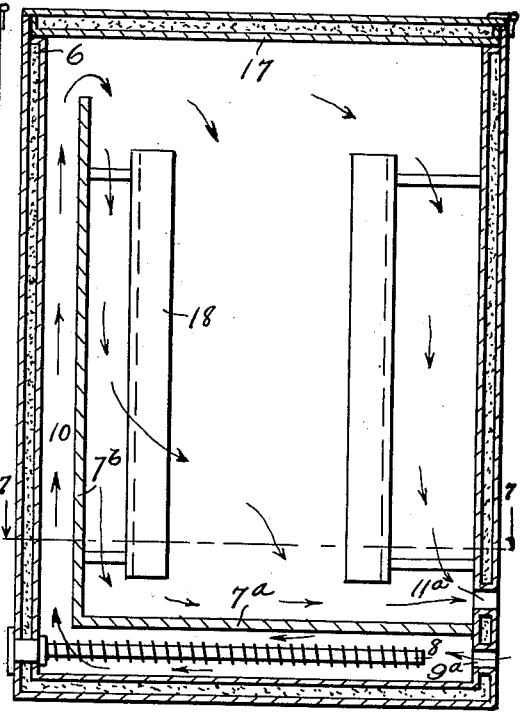
Fig. 6 is a transverse vertical section of the cabinet of Fig. 5.
Figure 7:
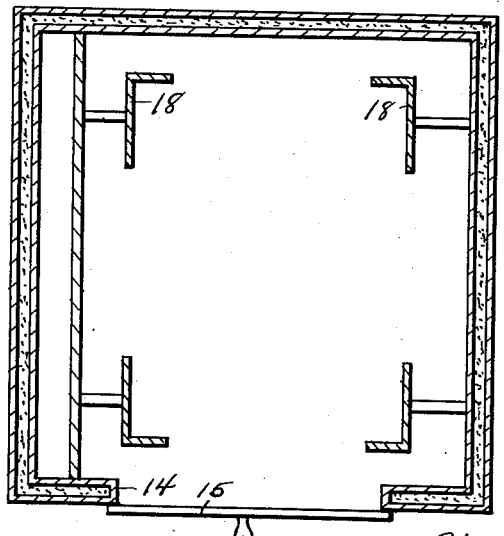
Fig. 7 is a horizontal section on line 7—7 of Fig. 6

In the form of the invention illustrated in Figures 5 to 7, the structure of the cabinet is very similar to that illustrated in Figures 1 to 3 in so far as the baffle is concerned, and the same reference characters have been applied. However, in this modification, the drawers are omitted and the front wall of the cabinet is provided with an opening 14, normally closed by a hinged door 15. This door is provided with spring hinges 16 which tend to keep the door closed. In this form of the invention, the top of the cabinet is open and is provided with a hinged cover 17 through which a stack of towels may be placed in the cabinet. The heating unit 8, like that previously described or of any other suitable nature, serves to heat the cabinet of Fig. 5 and to heat, dry and sterilize the towels of the stack, it being understood that the lowermost towels are successively withdrawn, when desired, through the door 15. The towels of the stack are held in place and guided by guide strips 18. It will be observed that these guide strips are spaced from the inner walls of the cabinet and from each other, so that the hot air may pass freely around the towels on its way from the air inlet opening or openings 9a to the air discharge opening or openings 11a.

Figure 8:
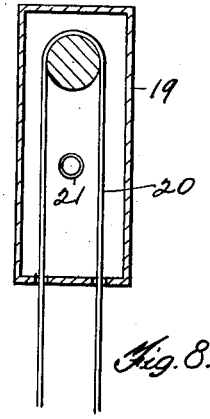
Fig. 8 is a sectional view of a roller towel cabinet hereinafter described.

In Fig. 8, 19 designates a cabinet which receives a roller towel 20, and a suitable type of heating unit indicated as 21 is disposed in this cabinet and serves to dry, heat, and sterilize said towel. While we have referred to towels as the articles to be heated, dried and sterilized, it is to be understood that we contemplate the use of these cabinets for the handling of any articles suitable for treatment therein. For example, a structure of this nature will be found of great utility in the drying, heating and sterilization of babies' diapers and other baby clothes. One advantage of the bin type of cabinet, illustrated in Figures 5 to 7, is that the towels that are removed are those that have been in the cabinet the longest and consequently are the driest, warmest, and best sterilized. When fresh towels are placed in the cabinet from the top, they will have sufficient time to be sterilized and be made warm and dry and ready for use while the older towels are being withdrawn from the bottom opening.

We consider the sterilization by dry heat to be of great importance, because we thereby provide means to destroy contagious germs in a very simple and inexpensive way. There are numerous diseases which are spread by the use of common towels, such as boils, pink-eye, trachoma, etc. Medical authorities advise that every individual should have his own towel, but if the towel is handled by others prior to its use, little or no benefit can be expected from individual towels, unless some sterilizer such as the cabinet of this invention is provided. By the use of a cabinet such as is illustrated in Figures 1 to 4, having a plurality of drawers, the towels belonging to the individual members of the family may be kept separate from each other and yet may all be dried and sterilized by a common heating means.

The use of a hot towel is more beneficial than the use of merely a dry towel. A hot towel stimulates the skin and wards off chapping by throwing heat into the interstices of the skin and instantly drying the clinging moisture. A hot Turkish towel prevents disagreeable chill after a cold shower and quickly normalizes the circulation. This invention thoroughly dries towels as well as heats them. It is well known that poorly dried or damp towels will not take up the moisture and dry the skin as quickly and efficiently as a completely dry and hot towel will do. Many towels are so heavy and thick that it is difficult to thoroughly dry them. Ironing does not eliminate the moisture. Dampness in varying degrees is retained, which gives the towels a "clammy" and unpleasant feeling when applied to the skin. Only a thorough after-heating will remove such dampness. Mildew and mustiness frequently set in when towels are put away in a damp condition. Cold or damp towels require more towel area to dry a given skin area than is the case where a hot dry towel is used, and more time is required to dry the skin with an unheated towel. By the use of this cabinet, used towels may be re-dried and thus fewer towels are needed. Further, the hot, dry towels may, upon occasion, be used as hot packs for congested parts of the body. Further, the cabinets of the present invention are of great utility in hospitals, since they provide means for drying and sterilizing sponges, surgical instruments, bandages, etc., while maintaining the highest degree of sanitation until such articles are ready for use. Many other advantages are inherent in the use of hot, dry, sterilized towels. However, since these advantages are inherent in the use of such towels irrespective of the means by which they are heated, it is deemed unnecessary to recite further advantages.

In conclusion, it is desired to emphasize that the invention is not limited to any specific mechanical construction, because it is clear that many ways will readily suggest themselves for accomplishing the object sought. Consequently, it is to be understood that the invention includes within its purview whatever changes fairly fall within either the terms or the spirit of the appended claims.

Having described our invention, what we claim is:

1. In combination a cabinet comprising insulated sheet metal bottom, top and four side walls, an imperforate baffle therein comprising a substantially horizontal wall spaced above the bottom of the cabinet and extending from one side wall thereof to a point spaced from the opposite wall and a substantially vertical wall spaced interiorly from a side wall of the cabinet and extending upwardly from the inner end of said horizontal wall to a point adjacent the top wall but being spaced at its upper end from said top wall, a heating element beneath the horizontal wall of the baffle and above the bottom of the cabinet, air inlet means beneath the horizontal wall of the baffle at that side of the cabinet remote from the vertical wall of the baffle, air outlet means in that side of the cabinet opposite to and remote from the vertical wall of the baffle but close to and at a point above the horizontal wall of the baffle, and article supporting means within the cabinet and between the vertical wall of the baffle and the side wall of the cabinet which contains the air outlet means, and spaced from both said vertical wall and said side wall to permit free flow of air downwardly along the opposite sides of the articles.

2. A structure as recited in claim 1 wherein the article supporting means comprises a plurality of slidable drawers of reticulated material which pass through the front wall of the cabinet and have imperforate front ends disposed to close the openings through which the drawers pass, when the drawers are in closed position.

3. A structure as recited in claim 1 wherein the article supporting means comprises a plurality of vertical guide strips lying in spaced relation to the walls of the cabinet and to the vertical wall of the baffle and the lower ends of which terminate short of the horizontal wall of the baffle and an outlet door in the side wall of the cabinet immediately above the horizontal wall of the baffle to permit the withdrawal of the lowermost article guided by said guide strips.

WALTER L. GILL.
VOLNEY C. KINCAID.